J. J. BOYER.
Bag-Fastener.
No. 215,087.  Patented May 6, 1879.
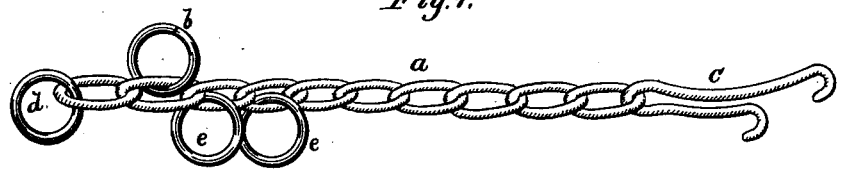
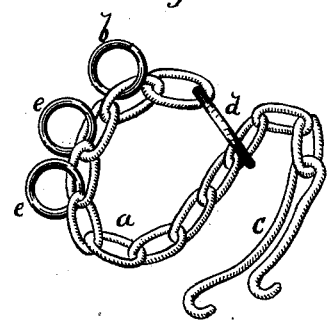

UNITED STATES PATENT OFFICE.

JACOB J. BOYER, OF HEBRON, NEBRASKA.

IMPROVEMENT IN BAG-FASTENERS.

Specification forming part of Letters Patent No. 215,087, dated May 6, 1879; application filed November 13, 1878.

*To all whom it may concern:*

Be it known that I, JACOB J. BOYER, of Hebron, in the county of Thayer and State of Nebraska, have invented a new and Improved Bag-Fastener, of which the following is a specification.

The object of this invention is to furnish a device which can be readily attached to grain and other bags, and used for fastening the mouth of the bag more or less tightly.

My invention consists in a metal chain, having at one point of its length a split ring for connection of the chain to a bag, and a double hook at one end, which, when the fastener is placed around a bag-mouth, is passed through a ring at the other end of the chain, and hooked into either one of a number of rings on the chain, to close the bag tightly.

In the accompanying drawings, Figure 1 is an elevation of my improved bag-fastener, and Fig. 2 shows the manner in which the fastener is used to secure a bag.

Similar letters of reference indicate corresponding parts.

$a$ is a chain of suitable length, having connected to one of its links a split ring, $b$, that can be passed through the material of the bag, to connect the fastener therewith. It will thus be retained upon the bag ready for use at any time. At one end of chain $a$ is a double-ended hook, $c$, one hook end of which is longer than the other. At the other end of chain $a$ is a ring, $d$; and $e$ $e$ are rings connected to separate links of the chain $a$ a short distance from ring $d$.

In using the above-described fastener, the mouth of the bag is to be gathered as usual, the chain $a$ then passed around the gathered portion, and the hook $c$ passed entirely through the ring $d$, as seen in Fig. 2, and the chain drawn tightly around the bag. The hook $c$ is then to be carried back, and either one of its hook ends caught into one of rings $e$, as most convenient, to retain the bag closed tightly.

The bag will thus be closed securely, and the fastener is not likely to get loose, as the strain will prevent separation of the hook from the ring.

A piece of rope or cord having the hook and rings, as described, attached to it may be used in place of chain; but I prefer a chain, which is sufficiently flexible, and will last longer than rope.

I am aware that it is not new in bag-fasteners to use a cord with ring at one end and hook at the other; but

What I claim as new is—

A bag-fastener whose chain or cord is provided with a wire, $c$, bent to form two unequal hooks, that pass through an end ring, $d$, and attached to either of the rings $c$, as shown and described.

JACOB JUNIUS BOYER.

Witnesses:
OWEN J. GIST,
WILLIAM J. GIST.